Oct. 4, 1966 J. E. KASTEN 3,276,554
FORAGE WAGON CLUTCH
Filed July 15, 1964
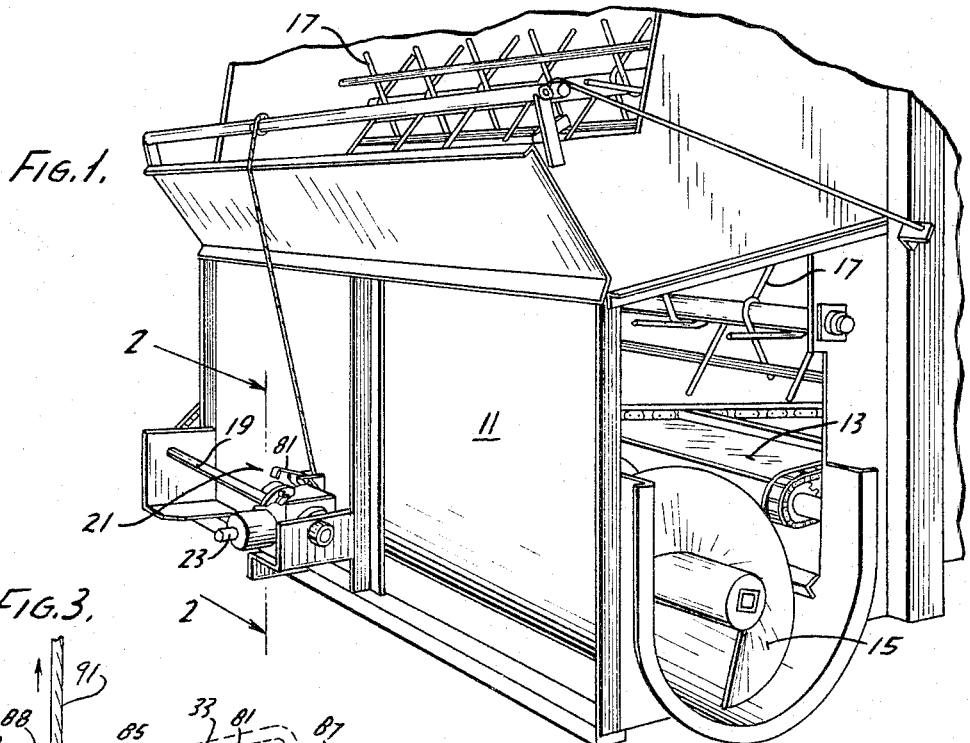
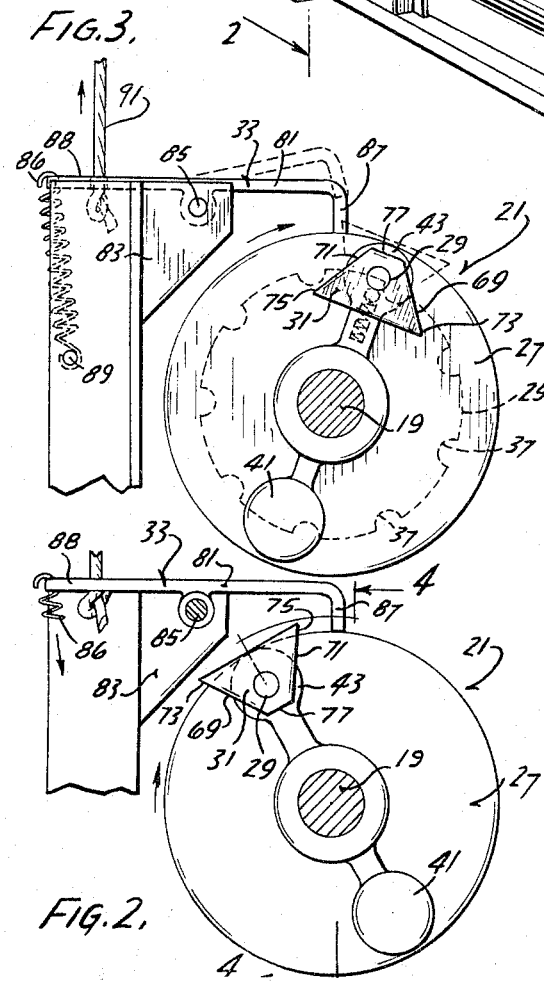
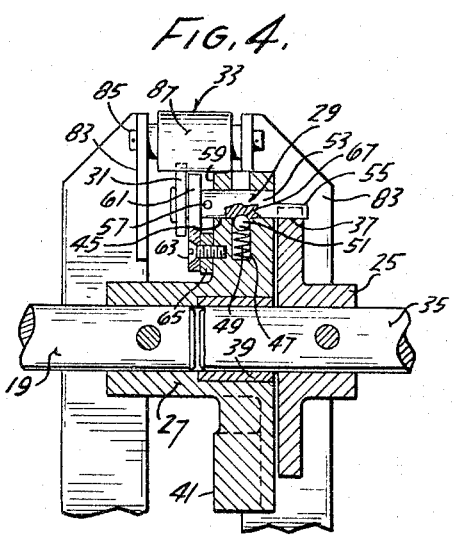
INVENTOR.
JOHN E. KASTEN
BY
Wheeler, Wheeler & Wheeler
ATTORNEYS.

United States Patent Office 3,276,554
Patented Oct. 4, 1966

3,276,554
FORAGE WAGON CLUTCH
John E. Kasten, 136 Concord Lane, West Bend, Wis.
Filed July 15, 1964, Ser. No. 382,797
11 Claims. (Cl. 192—29)

The invention relates generally to clutch constructions. The invention also relates to forage wagons.

The invention disclosed herein has for one object the provision of a safety clutch which is readily operable regardless of the direction of rotation of the coupled members. More specifically, the invention provides a dog or actuator which is shiftable between positions respectively associated with driving engagement and release of the coupled members and which includes a pair of surfaces positioned for engagement with a trip member so as to effect shifting of the dog to uncouple the connected members in response to rotation of the driving member. Consequently, whenever the trip member is operated, the clutch is released regardless of the direction of rotation of the driving member.

In the specifically disclosed construction, the surfaces on the dog or actuator are disposed in arcuate angular relation to each other and the dog is shiftable about an axis located generally between the surfaces. Other objects and advantages of the invention will become known by reference to the following description and the accompanying drawings in which:

FIGURE 1 is a fragmentary view of a forage wagon embodying various of the features of the invention;

FIGURE 2 is an enlarged fragmentary view, which is partially in section, which is taken along line 2—2 of FIGURE 1, and which illustrates a clutch construction embodying various of the features of the invention and shown in driving condition immediately prior to release;

FIGURE 3 is a view similar to FIGURE 2 showing the clutch construction in released condition; and FIGURE 4 is a fragmentary sectional view taken generally along line 4—4 of FIGURE 2.

The forage wagon 11 shown in FIGURE 1 comprises, in part, a support means, and includes movable components such as an apron conveyor 13, a discharge auger 15, and one or more beaters 17, which components are powered through a driven shaft 19 journalled by suitable means on the forage wagon 11. In turn, the driven shaft 19 can be coupled through a safety clutch 21 with a shaft 23 which can be powered by any suitable means or can be adapted for connection with the power take off of a tractor.

As it is desirable, under certain circumstances, to operate the apron conveyor 13 rearwardly as well as forwardly, it is also desirable that the safety clutch 21 be operable to disconnect the driven shaft 19 from the shaft 23 regardless of the direction of rotation of the shaft 23. The safety clutch construction shown in FIGURES 2, 3 and 4 is so operable.

The safety clutch construction shown in FIGURES 2, 3 and 4 includes a pair of respective driving and driven clutch members 25 and 27 which are rotatably supported by the forage wagon 11 in coaxial relation, a pin 29 which is carried by the driven clutch member 27 and which is shiftable to engage and disengage the clutch members, a dog or actuator 31 carried by the pin 29, and a trip lever or member 33 mounted on the forage wagon 11 and operable to engage the actuator 31 to effect release of the driven clutch member 27 from driving engagement by the driving clutch member 25.

More particularly, the driving clutch member 25 is a disk shaped member which is keyed to a driveshaft 35 which is journalled by suitable means on the forage wagon 11 and which is powered by the shaft 23. The driving clutch member 25 includes, along the circular periphery thereof, one or more semicylindrical recesses 37. A plurality of said recesses 37 facilitates easy engagement of the clutch members in driving engagement.

The driven clutch member 27 is also of generally disk shape and is keyed to the driven shaft 19. In addition, the driven clutch member 27 is axially recessed and supports a bearing 39 in which the ends of the driveshaft 35 is located, thereby assisting in assuring coaxial relationship of the driving and driven clutch members. Included on the driven clutch member 27 is a pair of diametrically opposed hubs 41 and 43. The hub 41 serves as a counter weight while the other hub 43 is provided with a bore 45 located in parallel relation to the rotational axis of the clutch members 25 and 27, and at a distance approximately equal to the peripheral radius of the driving clutch member 25. The bore 45 constitutes a means for mounting the pin 29 in the driven clutch member 27.

Extending transversely of the bore 45 and radially with respect to the rotational axis of the clutch members is a transverse bore 47 which houses a spring 49 and a detent ball 51.

The pin 29 comprises a main portion 53 which is, in part, received in the bore 45, and an end part or portion 55 which is relieved and has a generally semi-cylindrical, cross sectional form approximating that of the recess 37. The pin 29 is shiftable between a drive position in which the relieved end portion 55 is substantially wholly received in one of the recesses 37 and a diametrically opposed release position in which the relieved end portion 55 is clear of the periphery of the driving clutch member 27, thereby permitting free rotation of the driving clutch member 25 without effecting rotation of the driven clutch member 27.

Axial displacement of the pin 29 within the bore 45 is prevented while rotative displacement is permitted by means of a cotter pin 57 or the like which extends transversely from the pin 29 between the face 59 of the hub and a retaining bracket 61. The retaining bracket 61 is apertured to receive a part of the main portion 53 of the pin 29 and is fixed, as by a screw 63 extending through a spacer 65, to the driven clutch member 27.

Detent means are provided for retaining the pin 29 in its drive position. Such means comprises, in addition to the ball 51 and spring 49 located in the bore 47, a recess 67 in the pin 29 adapted to partially receive the ball 51 when the pin is in its driven position.

The dog or actuator 31 is welded or otherwise fixed to the end of the pin 29 extending through the retaining bracket 61. Included on the dog 31 are two convergent surfaces 67 and 69 which are adapted to be engaged by the trip member 33 to rotate the dog 31 and thereby effect accompanying rotation of the pin 29 from its drive position to its release position. In the specifically disclosed construction, the dog 31 is approximately in the form of a truncated equi-angular triangle or trapezoid which is centered with respect to the axis of the pin 29. The dog 31 is dimensioned so that, when the pin 29 is in its drive position, the respective ends 73 and 75 of the surfaces 69 and 71 extend beyond the periphery of the driven clutch member 27, and so that, when the pin 29 is in its release position, the truncated end 77 lies wholly within the periphery of the driven clutch member 27.

The trip lever or member 33 constitutes an L-shaped arm which is mounted, intermediate its long leg 81, on a bracket 83 extending from the forage wagon 11 and about pivot pin 85 extending parallel to the rotational axis of the clutch members 25 and 27. The trip member 33 is biased by suitable means, such as a spring 86, to a retracted position, shown in dotted outline in FIGURE 3, in which the end of the short leg 87 of the trip member is spaced radially beyond the periphery of the driven clutch member 27 and beyond the path of the ends 73 and 75 of the dog surfaces 69 and 71. The spring 86 is connected to the end 88 of the long leg 81 remote from the short leg 87 and to a stud 89 which is fixed with respect to the forage wagon 11. Also connected to the end 88 of the trip member 33 is a cord or rope 91 which, when pulled, serves to afford rotation of the trip member 33 into its operative position, shown in full lines in FIGURES 3 and 4, wherein the short leg 87 is positioned for engagement with one of the surfaces 69 and 71 to rotate the pin 29 from its drive position regardless of the direction of rotation of the driven clutch member 27. Movement of the trip member in the clockwise direction as seen in FIGURES 2 and 3 to its operative position is limited by engagement of the short leg 87 with the periphery of the driven clutch member 27. Disposition of the pivot pin 85 in parallel relation to the rotational axis of the clutch members serves generally to prevent backing off or movement of the trip member in the counterclockwise direction when the trip member is engaged with either of the surfaces 69 and 71.

The rope 91 can extend to any part of the forage wagon 11 where it, or a connected linkage, is readily available to an operator so as to enable pulling thereof to effect trip member movement which is effective to disengage the clutch members 25 and 27.

In operation, when the trip member 33 is shifted from its retracted to its operative position, as for example, by displacement of the rope 91, the short leg 87 of the trip member 33 engages one of the surfaces 69 and 71 before the completion of one complete revolution of the driven clutch member 27. Such engagement of the trip member 33 with the dog 31 serves to rotate the dog approximately 120 degrees. The relationship of the relieved pin portion 55 and the previously engaged recess 37 is such that continued rotation of the driving clutch member 25 will effect continued rotation of the pin 29 through approximately another 60 degrees until the pin is in its release position. Thus, regardless of the direction in which the clutch members 25 and 27 are rotating, the safety clutch 25 can be disengaged within one revolution by operation of the trip member 33. Re-engagement of the safety clutch 25 can be readily accomplished by aligning the pin 29 with one of the recesses 37 and manually shifting the pin to its drive position.

While the disclosed clutch has particular advantages in connection with the disclosed forage wagon, certain of the features of the invention can also be obtained when the clutch construction is employed in other environments.

Various of the features of the invention are set forth in the following claims.

What is claimed is:

1. A clutch comprising support means, first and second clutch members, means on said support means mounting said first and second clutch members about a common axis, a pin movably carried by one of said clutch members for displacement between a drive position in engagement with said other clutch member and a release position disengaged from said other clutch member, a single trip member, means mounting said trip member on said support means for movement between a retracted position and an operative position located to effect shifting of said pin from said drive position to said release position in response to rotation of said clutch members, a spring yieldably biasing said trip member toward said retracted position, and a dog extending from said pin, said dog including a pair of surfaces located for engagement with said trip member to effect shifting of said pin from said drive position to said release position in response to rotation of said clutch members when said trip member is located in said operative position and regardless of the direction of rotation of said clutch members.

2. The combination of support means, a first member having a semi-cylindrical recess in the periphery thereof, a second member, means on said support means mounting said first and second members about a common axis, a pin having a relieved portion with a semi-cylindrical surface, means mounting said pin in said second member for movement between a drive position wherein said relieved portion is drivingly engaged in said first member recess and a release position wherein said relieved portion is clear of said recess, a single trip member mounted on said support means for movement between a retracted position and an operative position located to effect shifting of said pin from said drive position to said release position in response to rotation of said members, a spring yieldably biasing said trip member toward said retracted position, and a dog extending from said pin, said dog including a pair of surfaces located for selective engagement with said trip member to effect shifting of said pin from said drive position to said release position in response to rotation of said members when said trip member is located in said operative position and regardless of the direction of rotation of said first and second members.

3. The combination of support means, a driving member having a semi-cylindrical recess in the periphery thereof, a driven member, means on said support means mounting said driving and driven members about a common axis, a pin having a relieved portion with a semi-cylindrical surface, means mounting said pin in said driven member for movement between a drive position wherein said relieved portion is drivingly engaged in said driving member recess and a release position wherein said relieved portion is clear of said recess, a single trip member, means mounting said trip member on said support means for movement between a retracted position and an operative position located to effect shifting of said pin from said drive position to said release position in response to rotation of said driving member, a spring yieldably biasing said trip member toward said retracted position, and a dog extending from said pin, said dog including a pair of surfaces located for engagement with said trip member to effect shifting of said pin from said drive position to said release position in response to rotation of said driving member when said trip member is located in said operative position and regardless of the direction of rotation of said driving and driven members.

4. The combination of support means, a driving member having a semi-cylindrical recess in the periphery thereof, a driven member, means on said support means mounting said driving and driven members about a common axis, a pin having a relieved portion with a semi-cylindrical surface, means mounting said pin in said driven member for oscillation about an axis parallel to said common axis between a drive position wherein said relieved portion is drivingly engaged in said driving member recess and a diametrically opposed release position wherein said relieved portion is clear of said recess, a single trip member, means mounting said trip member on said support means for movement about an axis parallel to said common axis between a retracted position and an operative position located to effect shifting of said pin from said drive position to said release position in response to rotation of said driving member, a spring yieldably biasing said trip member toward said retracted position, and a dog extending from said pin, said dog including a pair of surfaces located in acute angular relation to each other and extending for engagement with said trip member to effect shifting of said pin from said drive position to said release position in response to rotation of said driving member when said trip member is located in said operative position and regardless of the direction of rotation of said driving and driven members.

5. The combination of support means, a disk shaped driving clutch member having a semi-cylindrical recess in the periphery thereof, a disk shaped driven clutch member, means on said support means mounting said driving and driven clutch members about a common axis, a pin having a relieved portion with a semi-cylindrical surface, means mounting said pin in said driven member for oscillation about an axis parallel to said common axis between a drive position wherein said relieved portion is drivingly engaged in said driving clutch member recess and a diametrically opposed release position wherein said relieved portion is clear of the periphery of said driving clutch member, a single trip member, means mounting said trip member on said support means for movement between a retracted position and an operative position located to effect shifting of said pin from said drive position to said release position in response to rotation of said clutch members, a spring yieldably biasing said trip member toward said retracted position, and a dog of generally trapezoidal shape and including a pair of convergent surfaces located in acute angular relation to each other, said dog being mounted on said pin with the center of said dog in general alignment with said pin and with said surface extending beyond the circular periphery of said driven clutch member for engagement with said trip member to effect shifting of said pin from said drive position to said release position in response to rotation of said driving clutch member when said trip member is located in said operative position, and regardless of the direction of rotation of said driving and driven clutch members.

6. The combination of support means, a disk shaped driving clutch member having a series of semi-cylindrical recesses in the periphery thereof, a disk shaped driven clutch member, means on said support means mounting said driving and driven clutch members about a common axis, a pin having a relieved portion with a semi-cylindrical surface, means mounting said pin in said driven member for oscillation about an axis parallel to said common axis between a drive position wherein said relieved portion is drivingly engaged in one of said driving clutch member recessess and a diametrically opposed release position wherein said relieved portion is clear of the periphery of said driving clutch member, a single trip member of generally L shape including a short leg and a long leg, means on said support means pivotally carrying said long leg to afford movement of said short leg between a retracted position and an operative position located to effect shifting of said pin from said drive position to said release position in response to rotation of said driving clutch member, a spring yieldably biasing said trip member toward said retracted position, and a dog of generally trapezoidal shape and including a pair of convergent surfaces located in acute angular relation to each other, said dog being mounted on said pin with the center of said dog in general alignment with said pin and with said surfaces extending beyond the circular periphery of said driven clutch member for engagement with said short leg of said trip member to effect shifting of said pin from said drive position to said release position in response to rotation of said driving clutch member when said trip member short leg is located in said operative position, and regardless of the direction of rotation of said driving and driven clutch members.

7. In a forage wagon, the combination of support means, a movable component carried by said support means, a first shaft rotatably mounted on said support means and connected to said component for driving thereof, a second shaft rotatably mounted on said support means coaxial with said first shaft and adapted to be driven from a power source, a first clutch member keyed to said first shaft, a second clutch member keyed to said second shaft, a pin movably carried by one of said clutch members for displacement between a drive position in engagement with said other clutch member and a release position disengaged from said other clutch member, a single trip member, means mounting said trip member on said support means for movement between a retracted position and an operative position located to effect shifting of said pin from said drive position to said release position in response to rotation of said clutch members, a spring yieldably biasing said trip member toward said retracted position, and a dog extending from said pin, said dog including a pair of surfaces located for engagement with said trip member to effect shifting of said pin from said drive position to said release position in response to rotation of said clutch members when said trip member is located in said operative position and regardless of the rotative direction of said clutch members.

8. In a forage wagon, the combination of support means, a movable component carried by said support means, a first shaft rotatably mounted on said support means and connected to said component for driving thereof, a second shaft rotatably mounted on said support means coaxial with said first shaft and adapted to be driven from a power source, a driven clutch member keyed to said first shaft, a driving clutch member keyed to said second shaft and having a semi-cylindrical recess in the periphery thereof, a pin having a relieved portion with a semi-cylindrical surface, means mounting said pin in said driven clutch member for movement between a drive position wherein said relieved portion is drivingly engaged in said driving clutch member recess and a release position wherein said relieved portion is clear of said recess, a single trip member mounted on said support means for movement between a retracted position and an operative position located to effect shifting of said pin from said drive position to said release position in response to rotation of said driving clutch member, a spring yieldably biasing said trip member toward said retracted position, and a dog extending from said pin, said dog including a pair of surfaces for engagement with said trip member to effect shifting of said pin from said drive position to said release position in response to rotation of said driving clutch member when said trip member is located in said operative position and regardless of the direction of rotation of said driving and driven clutch members.

9. In a forage wagon, the combination of support means, a movable component carried by said support means, a first shaft rotatably mounted on said support means and connected to said component for driving thereof, a second shaft rotatably mounted on said support means coaxial with said first shaft and adapted to be driven from a power source, a driven clutch member keyed to said first shaft, a driving clutch member keyed to said second shaft and having a series of semi-cylindrical recesses in the periphery thereof, a pin having a relieved portion with a semi-cylindrical surface, means mounting said pin in said driven member for oscillation about an axis paralled to said common axis between a drive position wherein said relieved portion is drivingly engaged in one of said driving clutch member recesses and a diametrically opposed release position wherein said relieved portion is clear of the periphery of said driving clutch member, a single trip member of generally L shape including a short leg and a long leg, means on said support means pivotally carrying said long leg to afford movement of said short leg between a retracted position and an operative position located to effect shifting of said pin from said drive position to said release position in response to rotation of said driving clutch member, a spring yieldably biasing said trip member toward said retracted position, and a dog of generally trapezoidal shape and including a pair of convergent surfaces located in acute angular relation to each other, said dog being mounted on said pin with the center of said dog in general alignment with said pin and with said surface extending beyond the circular periphery of said driven clutch member for engagement with said short leg of said trip member to effect shifting of said pin from said drive position to said release position in response to rotation of said driving clutch member when said trip member short leg is located in said operative position, and regardless of the direction of rotation of said driving and driven clutch members.

10. A clutch comprising support means, first and second clutch members, means on said support means mounting said first and second clutch members about a common axis, a pin movably carried by one of said clutch members for displacement between a drive position in engagement with said other clutch member and a release position disengaged from said other clutch member, a single trip member, means mounting said trip member on said support means for movement between a retracted position and an operative position located to effect shifting of said pin from said drive position to said release position in response to rotation of said clutch members, means yieldably biasing said trip member toward said retracted position, and means extending from said pin for engagement with said trip member to effect shifting of said pin from said drive position to said release position in response to rotation of said clutch members when said trip member is located in said operative position and regardless of the direction of rotation of said clutch members.

11. In a forage wagon, the combination of support means, a movable component carried by said support means, a first shaft rotatably mounted on said support means and connected to said component for driving thereof, a second shaft rotatably mounted on said support means coaxial with said first shaft and adapted to be driven from a power source, a first clutch member keyed to said first shaft, a second clutch member keyed to said second shaft, a pin movably carried by one of said clutch members for displacement between a drive position in engagement with said other clutch member and a release position disengaged from said other clutch member, a single trip member, means mounting said trip member on said support means for movement between a retracted position and an operative position located to effect shifting of said pin from said drive position to said release position in response to rotation of said clutch members, means yieldably biasing said trip member toward said retracted position, and means extending from said pin for engagement with said trip member to effect shifting of said pin from said drive position to said release position in response to rotation of said clutch members when said trip member is located in said operative position and regardless of the rotative direction of said clutch members.

References Cited by the Examiner
UNITED STATES PATENTS
3,176,812   4/1965   Towne _____ 192—71

FOREIGN PATENTS
1,216,279   11/1959   France

DAVID J. WILLIAMOWSKY, *Primary Examiner.*